Figure 1:
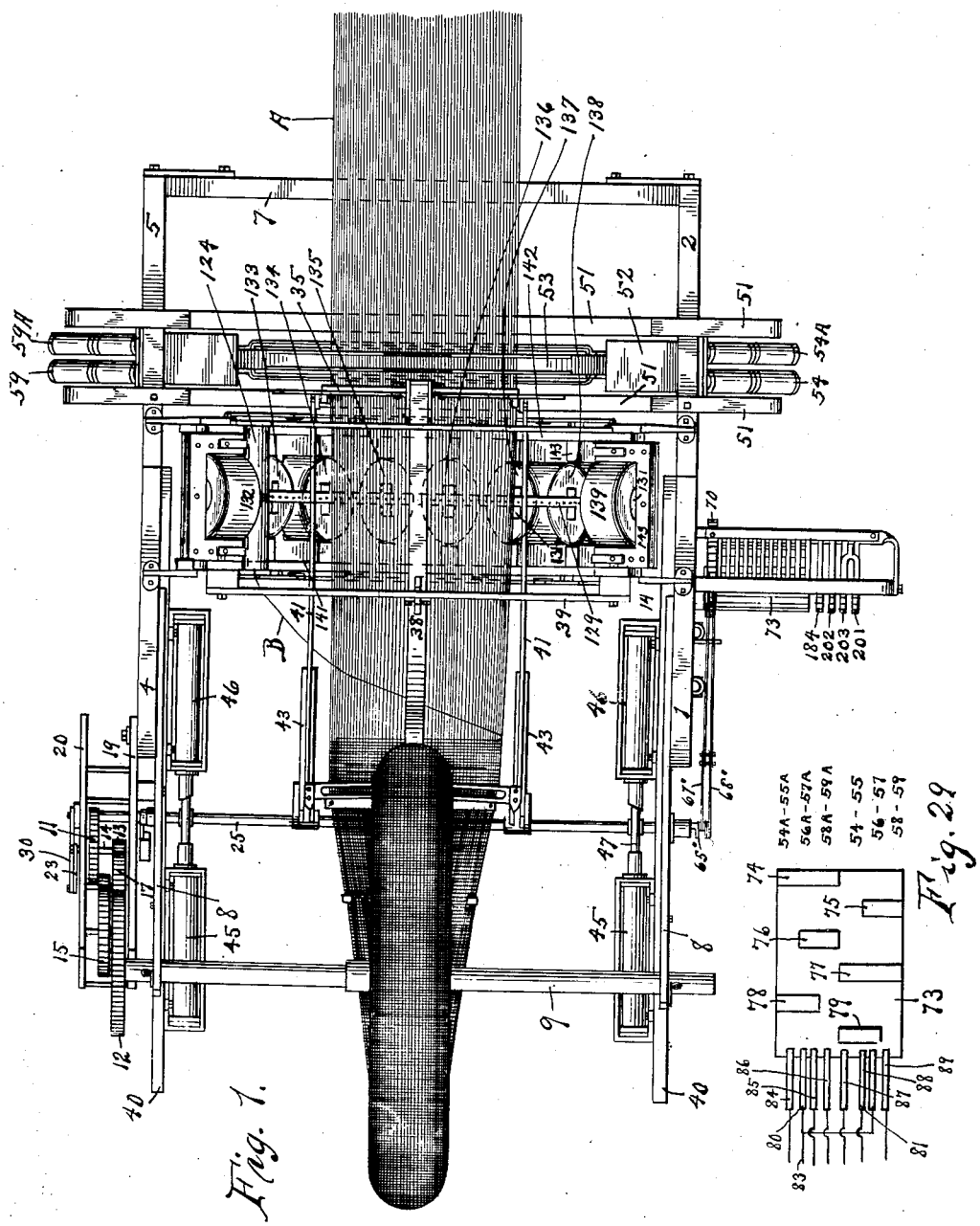

J. E. CLARK, W. A. SCHAFFER, AND T. E. CLARK.
LOOM.
APPLICATION FILED FEB. 27, 1918.

1,409,892.

Patented Mar. 14, 1922.
13 SHEETS—SHEET 1.

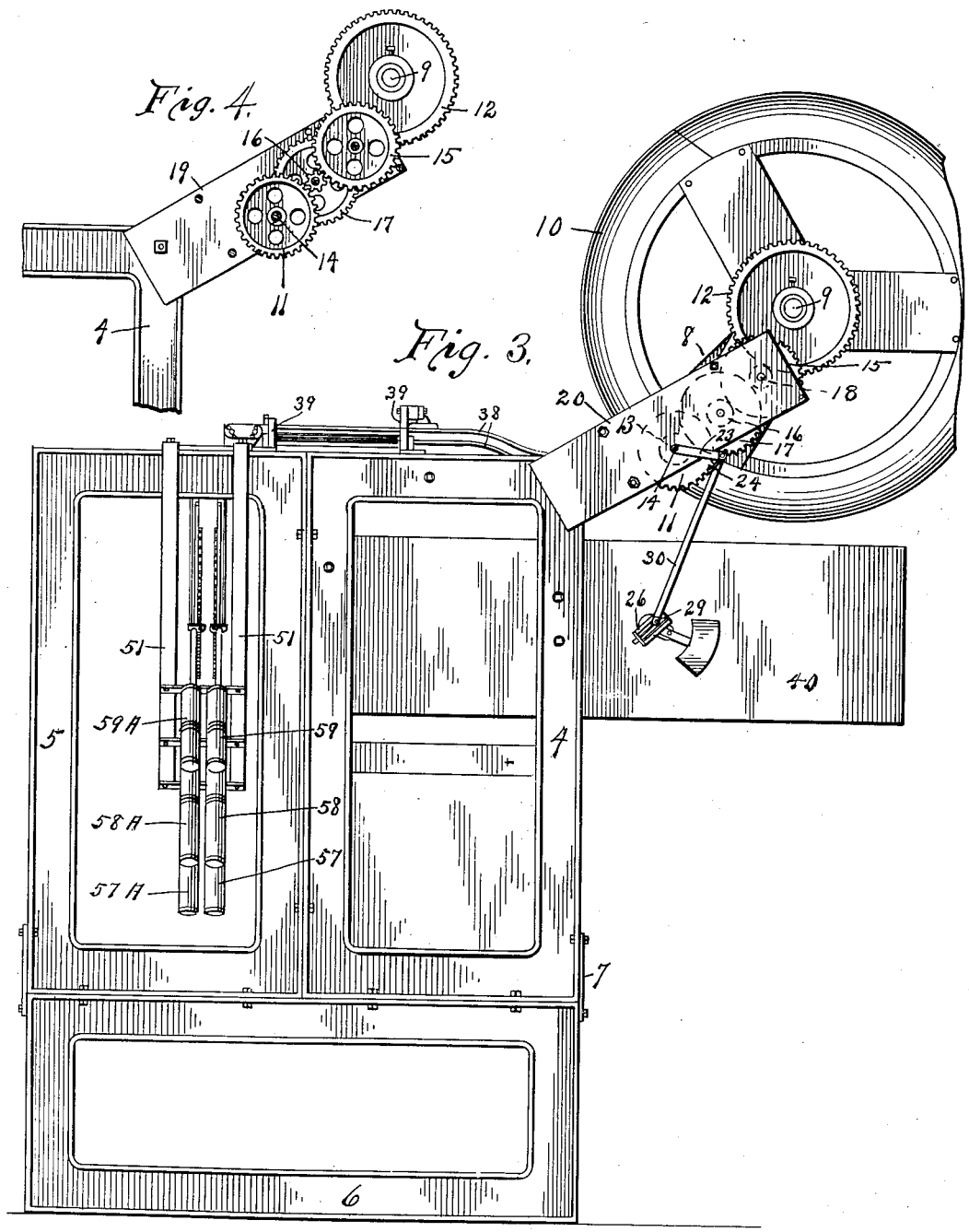

J. E. CLARK, W. A. SCHAFFER, AND T. E. CLARK.
LOOM.
APPLICATION FILED FEB. 27, 1918.
1,409,892.
Patented Mar. 14, 1922.
13 SHEETS—SHEET 4.
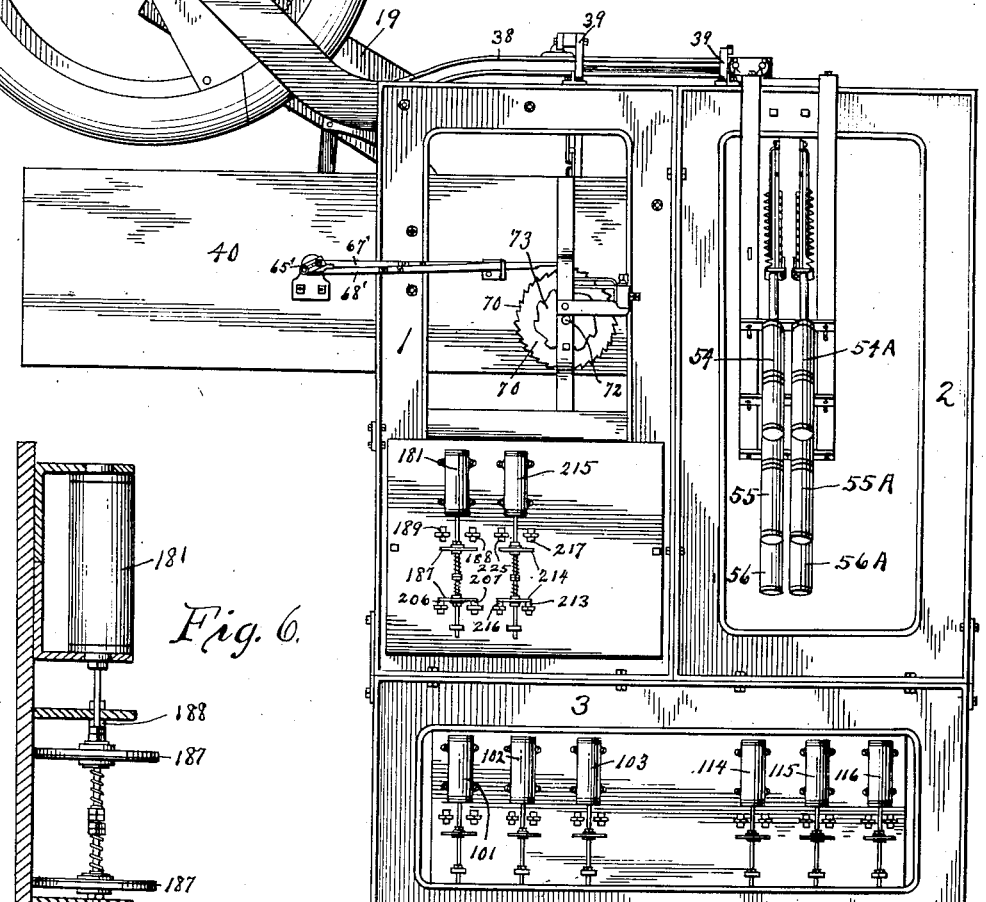

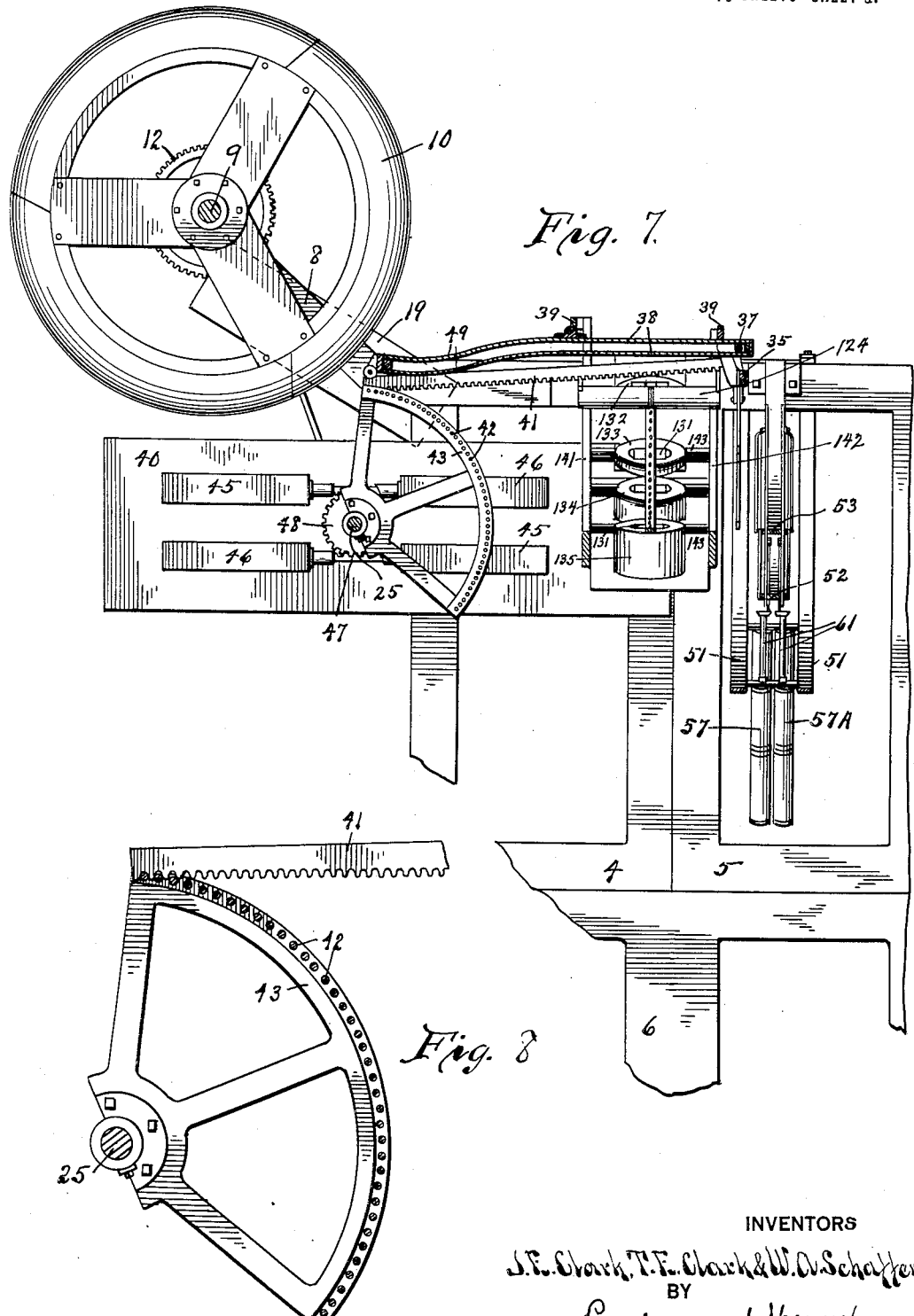

J. E. CLARK, W. A. SCHAFFER, AND T. E. CLARK.
LOOM.
APPLICATION FILED FEB. 27, 1918.
1,409,892.
Patented Mar. 14, 1922.
13 SHEETS—SHEET 6.
Fig. 9.
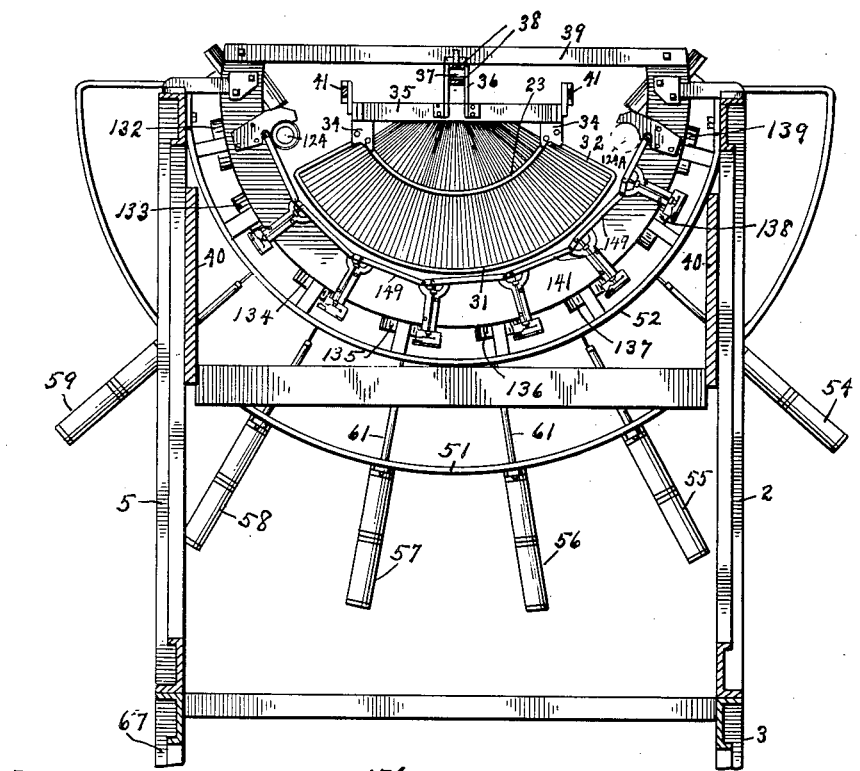
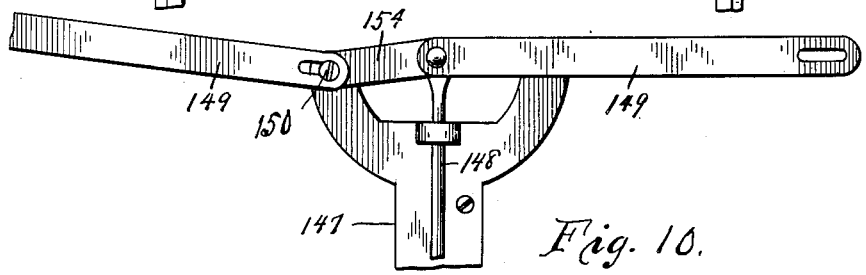
Fig. 10.
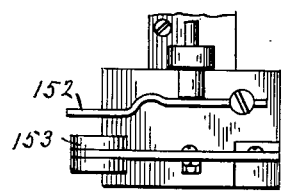
INVENTORS
J.E.Clark, T.E.Clark & W.A.Schaffer
BY
Pagelsen and Spencer
ATTORNEYS

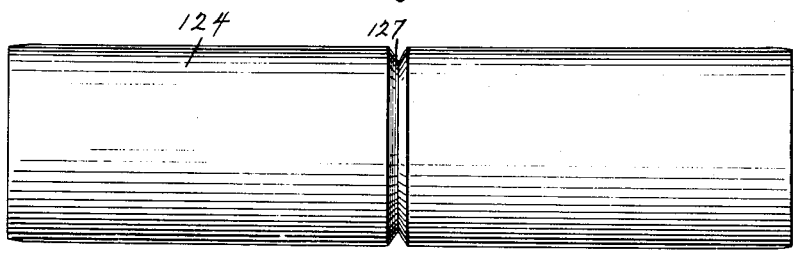
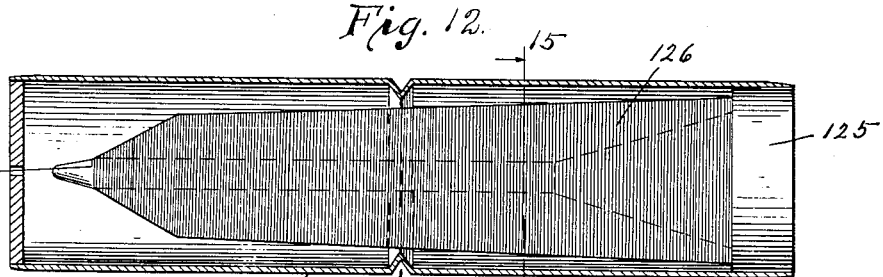
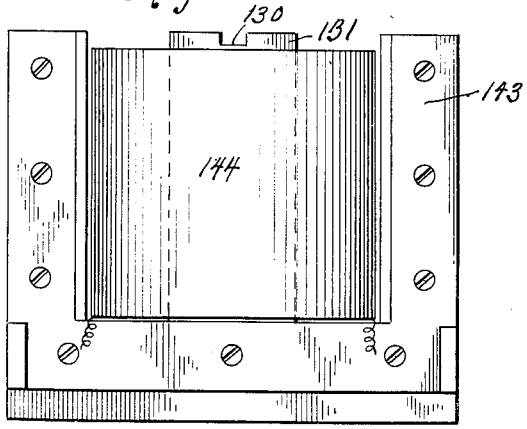
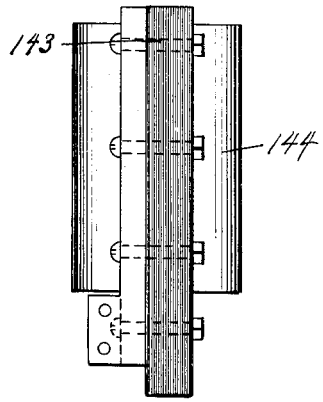
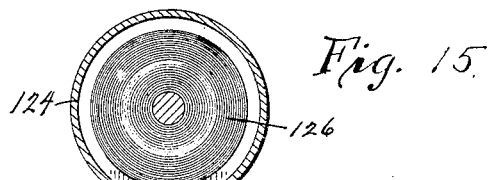

J. E. CLARK, W. A. SCHAFFER, AND T. E. CLARK.
LOOM.
APPLICATION FILED FEB. 27, 1918.

1,409,892.

Patented Mar. 14, 1922.
13 SHEETS—SHEET 8.

INVENTOR
J. E. Clark, T. E. Clark & W. A. Schaffer
BY
Pagelsen and Spencer
ATTORNEYS

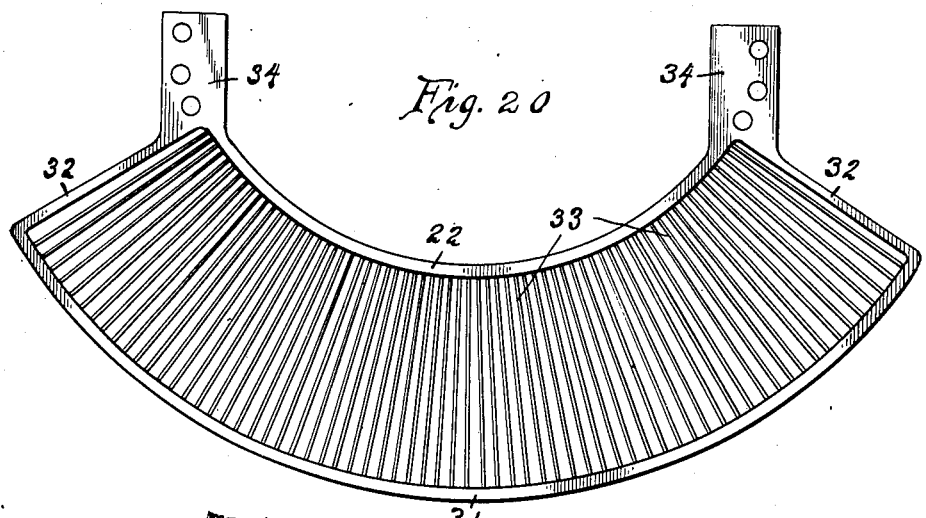
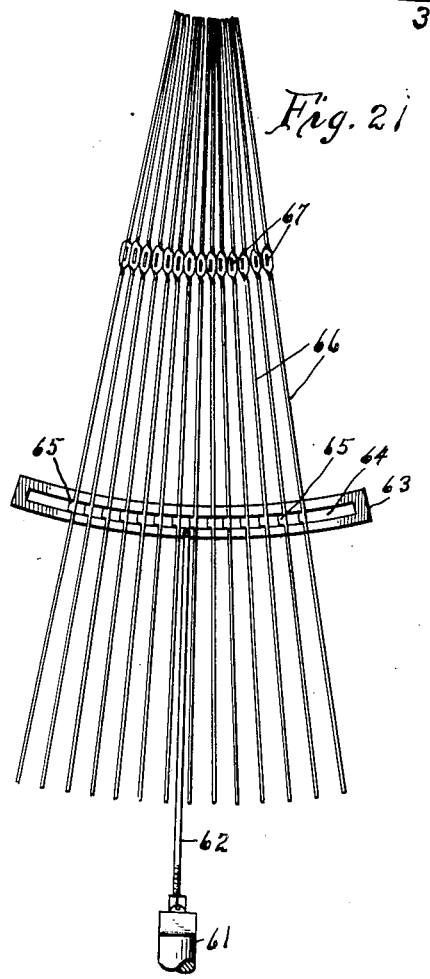
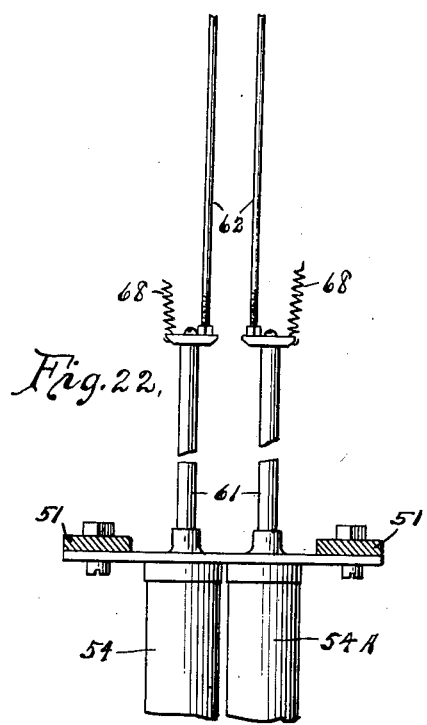

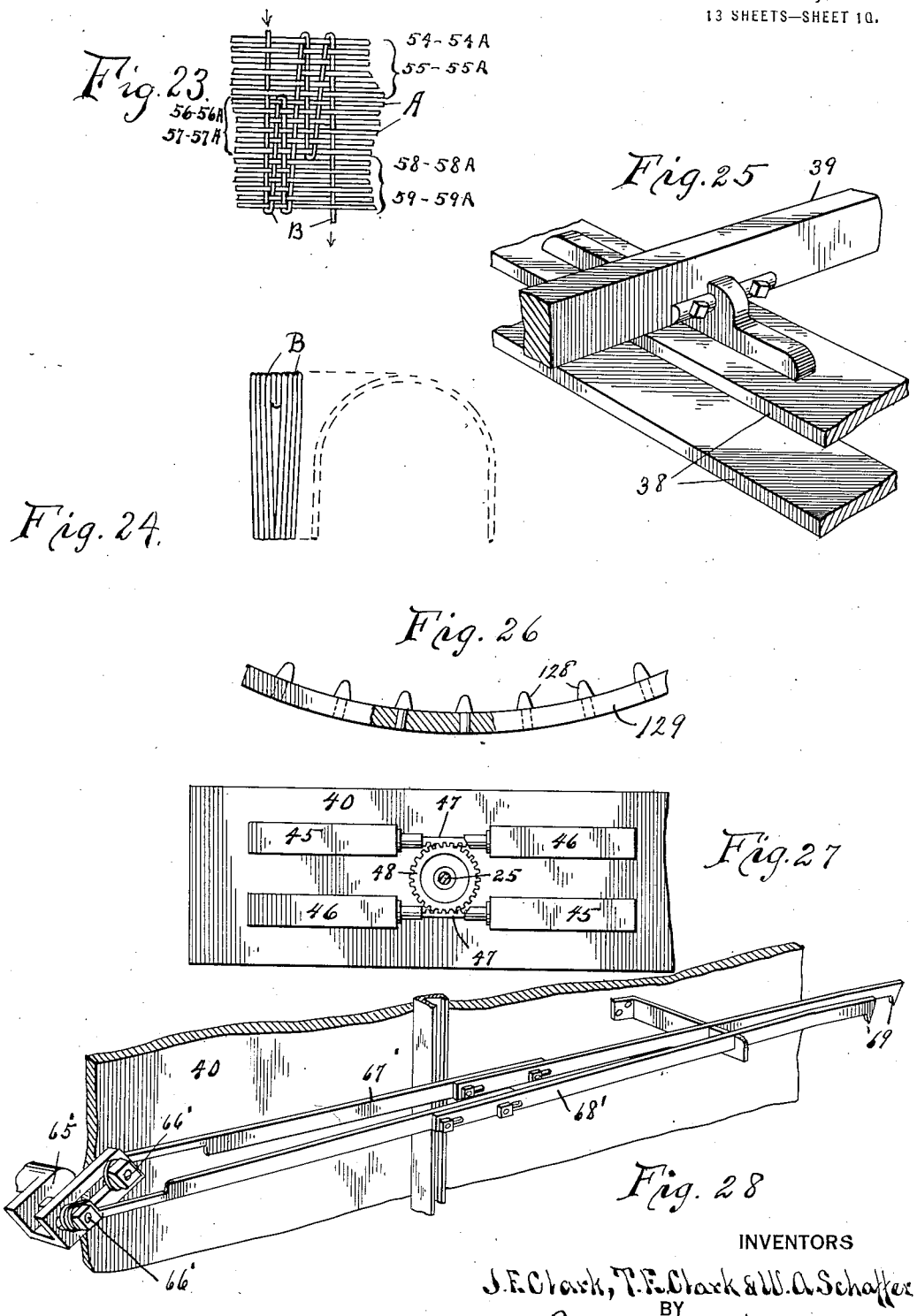

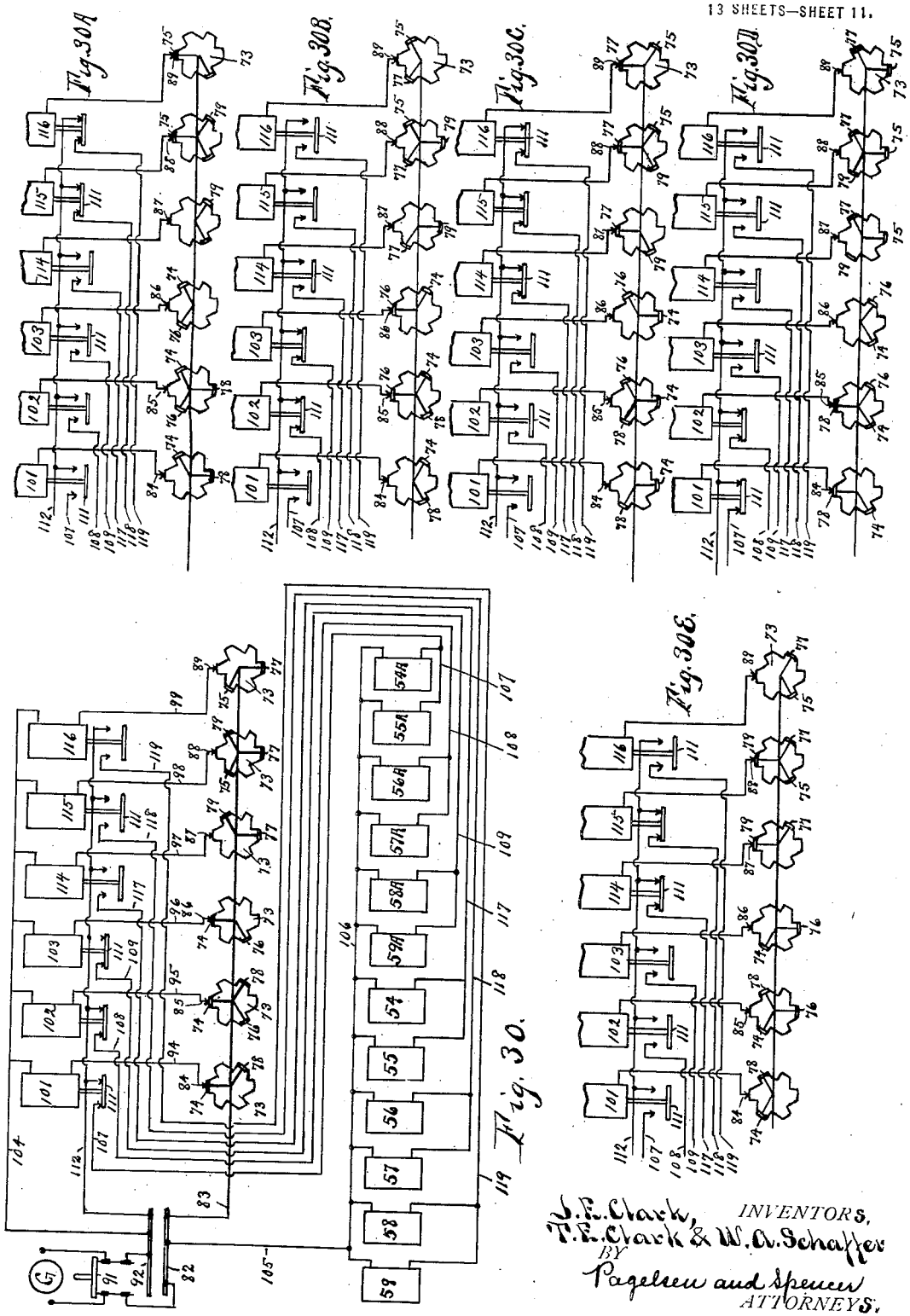

J. E. CLARK, W. A. SCHAFFER, AND T. E. CLARK.
LOOM.
APPLICATION FILED FEB. 27, 1918.
1,409,892.
Patented Mar. 14, 1922.
13 SHEETS—SHEET 12.
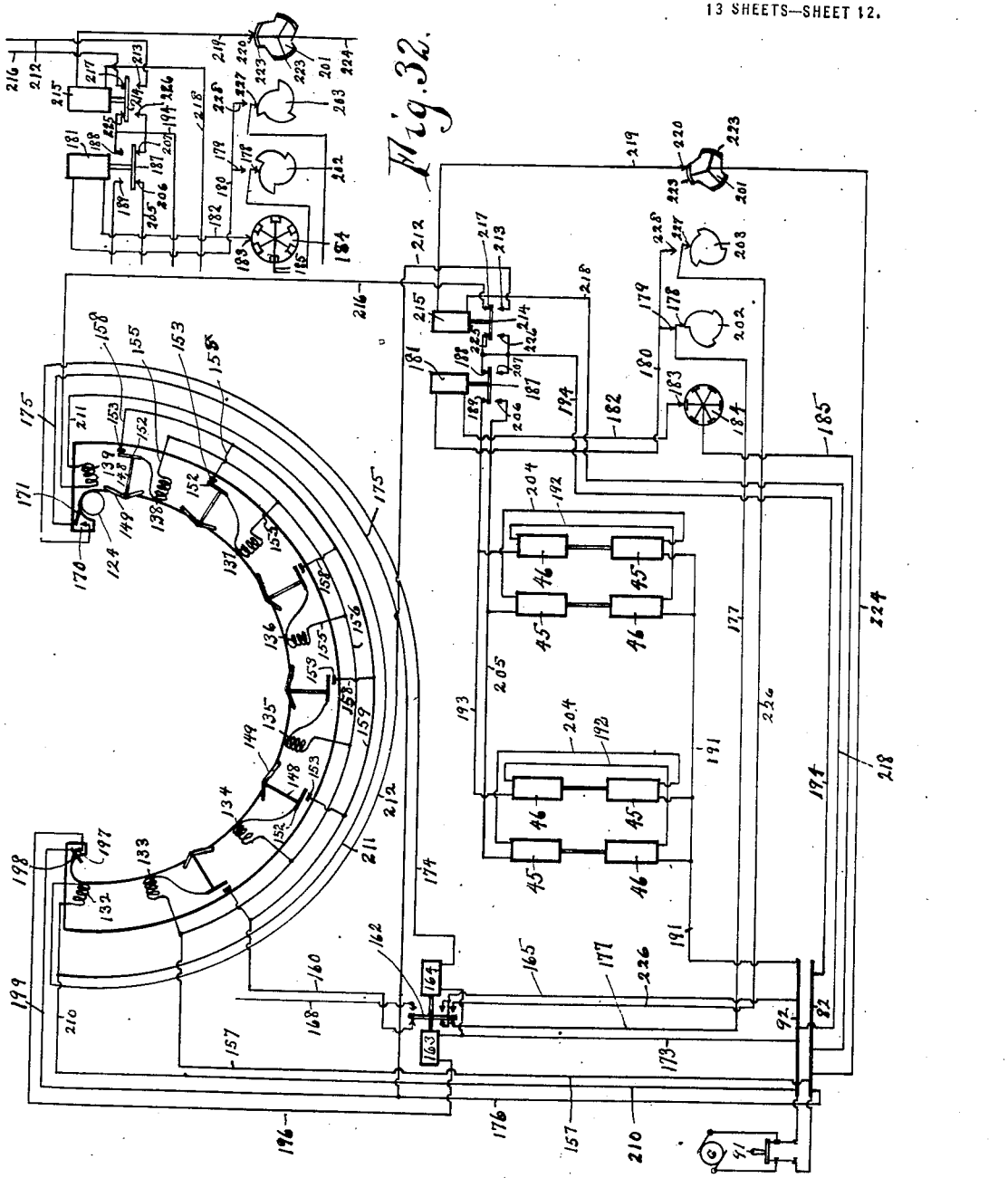
INVENTORS.
J. E. Clark, T. E. Clark & W. A. Schaffer.
BY
Pagelsen and Spencer
ATTORNEYS.

J. E. CLARK, W. A. SCHAFFER, AND T. E. CLARK.
LOOM.
APPLICATION FILED FEB. 27, 1918.
1,409,892.
Patented Mar. 14, 1922.
13 SHEETS—SHEET 13.
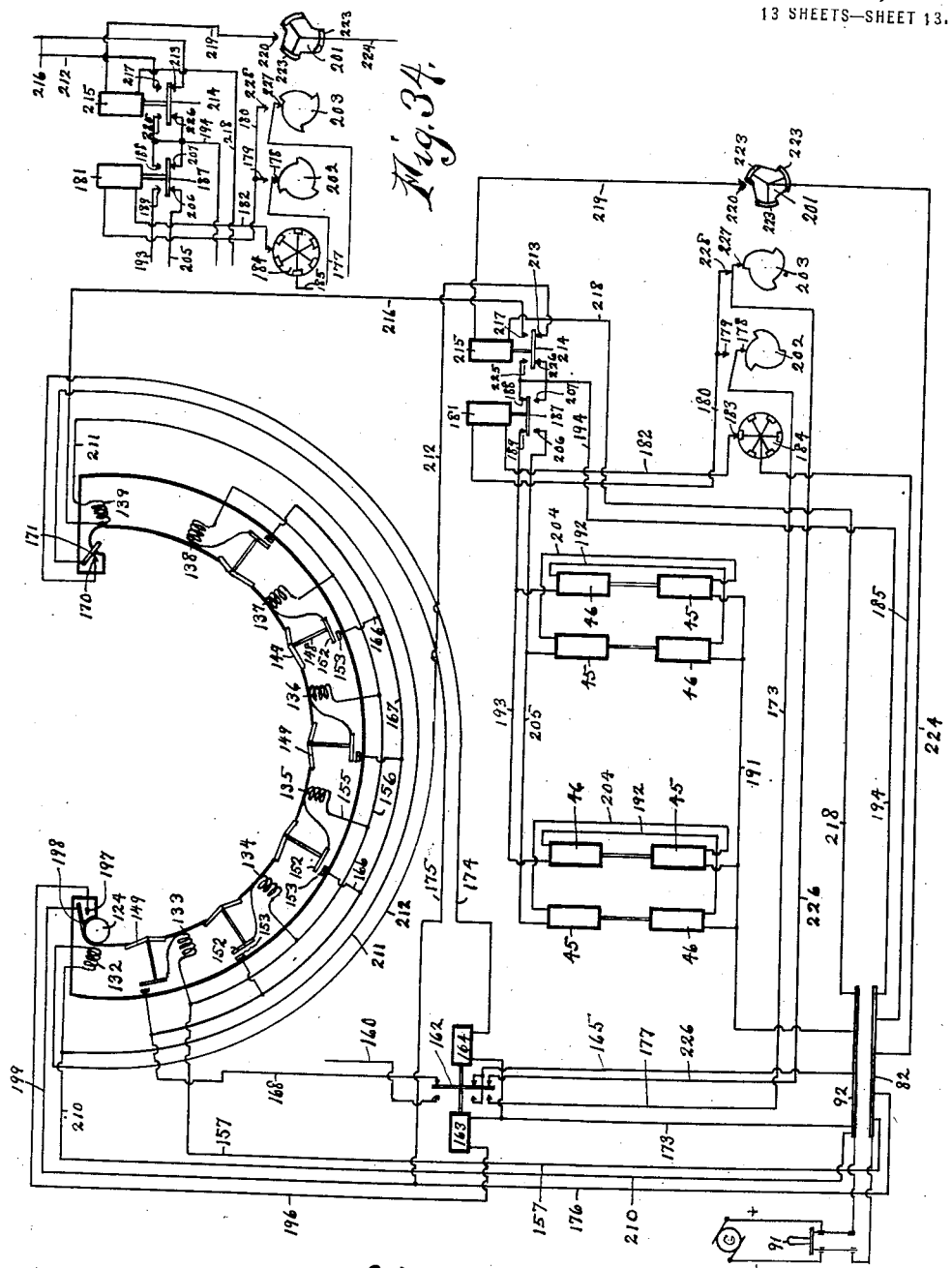
INVENTORS
J. E. Clark, T. E. Clark, & W. A. Schaffer
BY
Pagelsen and Spencer
ATTORNEYS

UNITED STATES PATENT OFFICE.

JAMES E. CLARK, WILLIAM A. SCHAFFER, AND THOMAS E. CLARK, OF DETROIT, MICHIGAN, ASSIGNORS TO THE SCHAFFER LOOM COMPANY, INCORPORATED, OF BUFFALO, NEW YORK, A CORPORATION OF NEW YORK.

LOOM.

1,409,892.         Specification of Letters Patent.     Patented Mar. 14, 1922.

Application filed February 27, 1918. Serial No. 219,380.

*To all whom it may concern:*

Be it known that we, JAMES E. CLARK, WILLIAM A. SCHAFFER, and THOMAS E. CLARK, citizens of the United States, and residing at Detroit, county of Wayne, and State of Michigan, have invented a new and Improved Loom, of which the following is a specification.

This invention relates to looms for weaving tubular body fabrics for pneumatic tire casings and its object is to provide a loom which will weave a fabric of sufficient width to extend from edge to edge of the tire casing and whose middle portion will be so much longer than the edges that it will conform to the normal contour of the tire without stretching, thus insuring a practically uniform normal and initial tension on all the warp and weft strands of the fabric.

A further object of this invention is to provide a loom with electro-magnetic devices for operating the shuttle containing the weft strands so that it will travel substantially without friction back and forth through a circular arc between the warp strands.

Another object of this invention is to provide a loom with electro-magnetic devices for operating the reed or weft beater after the shuttle has caused a proper circuit to close when the shuttle has reached either end of its path, said reed being segmental and formed with a series of radially extending fingers.

Another object of this invention is to provide a loom with heddles which are movable along radial lines toward and from a common center, electro-magnetic means for actuating said heddles in predetermined groups, and a controlling device for the circuits to said electro-magnetic means which device is operatively connected to the reed-actuating means.

Another object of this invention is to provide proper electric circuits to the various electro-magnetic motors and switches and relays in said circuit, so that the sequence of operations of the various parts may be predetermined and so that improper operation of any vital part of the loom will cause all of the mechanism to stop at once so that no damage can be done to the loom itself or to the fabric being produced therein.

This invention consists in the combination embodied in the structure shown in the accompanying drawings and more particularly stated in the following claims.

Figure 2:
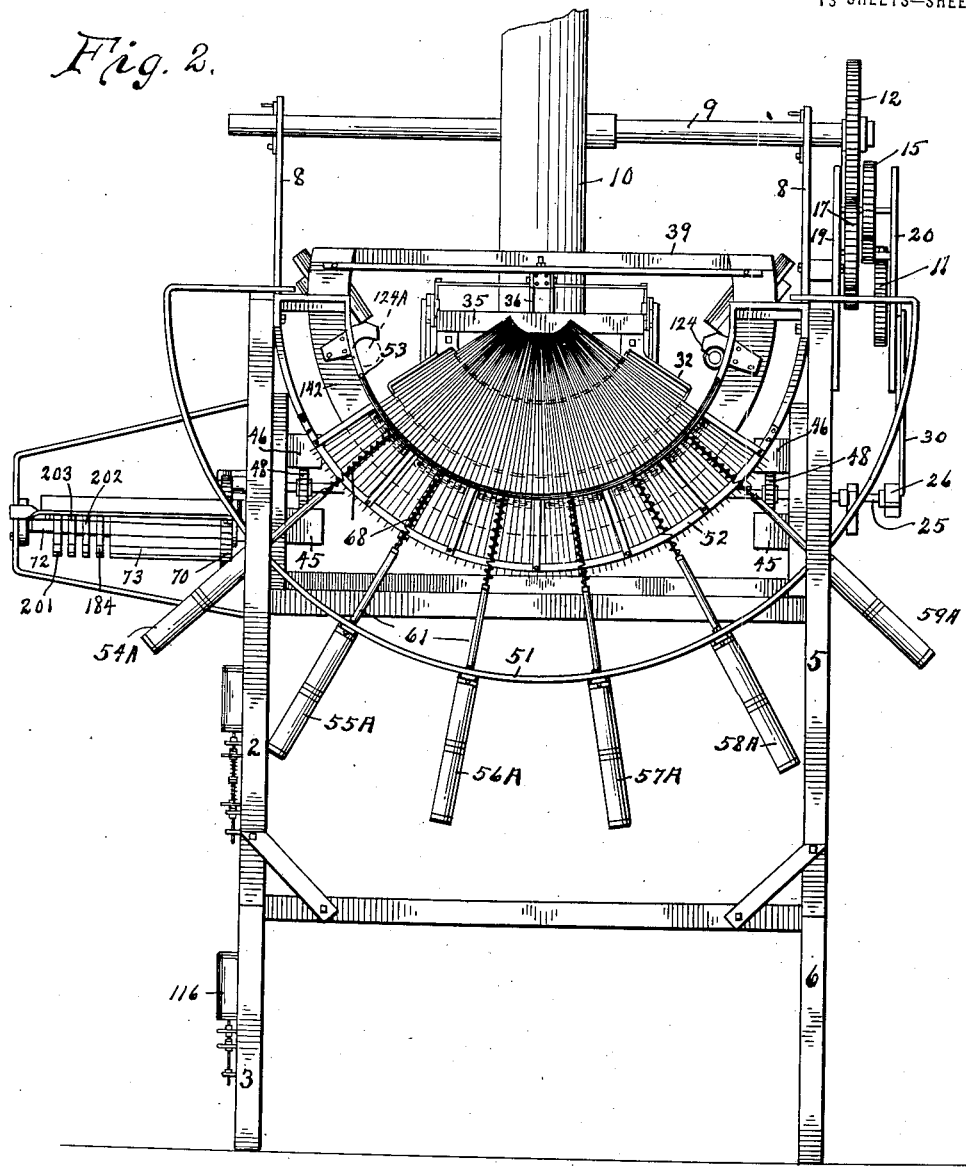
Figure 21:
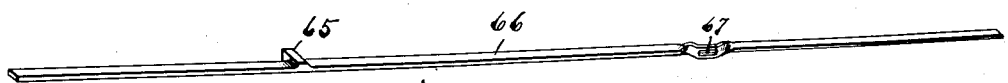
Figure 16:
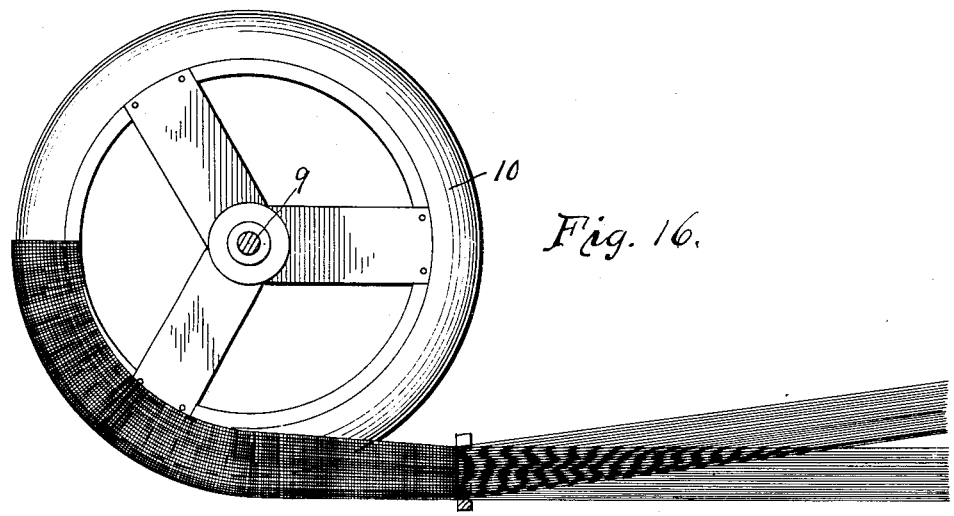
Figure 17:
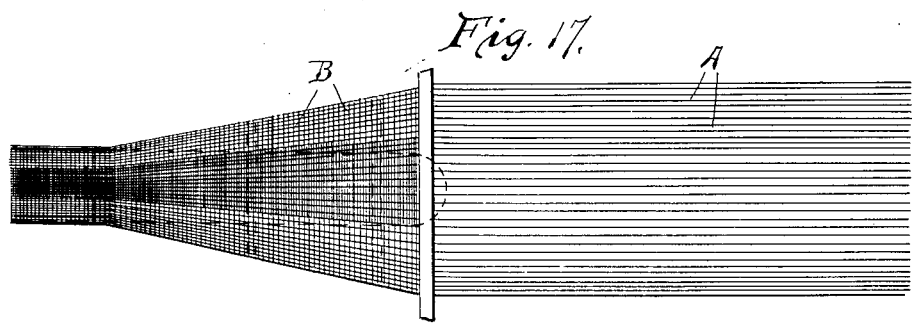
Figure 18:
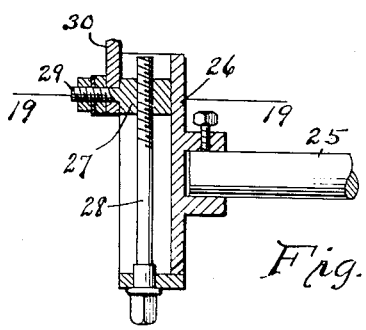
Figure 19:
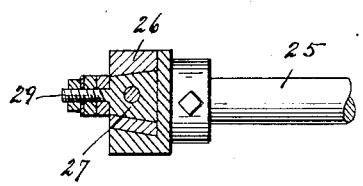

In the drawings, Fig. 1 is a plan of this improved loom. Fig. 2 is a rear elevation thereof. Fig. 3 is an elevation of the left side of the loom. Fig. 4 is a detail of the gears for driving the reel. Fig. 5 is an elevation of the right side of the loom. Fig. 6 is an elevation of a two position relay to control the reed-actuating solenoids. Fig. 7 is a central longitudinal section of the loom. Fig. 8 is a detail of a driving sector for the reed. Fig. 9 is a vertical section of the loom just in front of the track for the shuttle and looking toward the rear. Fig. 10 is a detail of a switch in the shuttle-actuating mechanism. Fig. 11 is an elevation of the shuttle. Fig. 12 is a central longitudinal section thereof Fig. 13 is a front and Fig. 14 a side elevation of one of the magnets for actuating the shuttle. Fig. 15 is a section on the line 15—15 of Fig. 12. Fig. 16 is an elevation of the reel and the fabric thereon. Fig. 17 is a plan of the fabric. Fig. 18 is a longitudinal section of the cross-head for operating the reel. Fig. 19 is a section on the line 19—19 of Fig. 18. Fig. 20 is a front elevation of the reed. Fig. 21 is an elevation of a group of heddles and the yoke by which they are operated. Fig. 21$^A$ is a perspective of one of these heddles. Fig. 22 is an elevation of the upper ends of a pair of heddles-operating magnets. Fig. 23 is a diagram illustrative of the fabric woven on this loom. Fig. 24 is a diagrammatic illustration of the position of the weft threads in the finished fabric when laid around a wheel tire. Fig. 25 is a view of the means for securing the track for the reed to the cross bar supporting it. Fig. 26 is a view of the track for the shuttle. Fig. 27 is an elevation of the reed-actuating solenoids. Fig. 28 is a view of the actuating mechanism for the electric controller. Fig. 29 is a development of the controller for the heddle-actuating solenoids. Fig. 30 is a diagram of the solenoids for actuating the heddles and the relays and circuits therefor. Figs. 30$^A$ to 30$^E$ inclusive are similar diagrams illustrating the parts in different positions. Fig. 31 is a diagram illustrating the relays, magnets and circuits for controlling and actuating the shuttle and the reed. Fig. 32 is a diagram of a portion thereof showing the parts at the end of the working stroke of the reed. Fig. 33 is a diagram similar to Fig. 31 indicating the positions when the shuttle is at the opposite end of its track. Fig. 34 is a diagram of the portion shown in Fig. 32 at the end of the working stroke of the reed when the shuttle is in the position indicated in Fig. 33.

Similar reference characters refer to like parts throughout the several views.

This loom consists of a frame supporting the various parts; a reel in the form of a vehicle wheel to receive the completed fabric and means to actuate the reel; a reed to beat the weft threads against the end of the finished fabric and electro-magnetic means to actuate the reed; heddles and electro-magnetic means for actuating the heddles; a shuttle, a guideway therefor, and electro-magnetic means for actuating the shuttle; and controlling devices including switches and relays to cause the various parts of the loom to operate synchronously. The various parts will be described in the order mentioned.

*The frame and reel.*

The frame of this loom consists of two sides, preferably formed of the plates 1, 2, 3 and 4, 5 and 6 respectively although the sides may each be made of one piece. The delivery end of the loom will be considered as the front. These sides may be connected by cross braces 7.

Extending up from the front ends of the sides are arms 8 that support the shaft 9 of the reel 10 which has the general form of a vehicle wheel provided with a pneumatic tire.

On the shaft 9 is a gear 12, (Figs. 3 and 4), which is driven by the pinions 13 on the shaft 14 through intermediate gears and pinions 15, 16, 17 and 18, all mounted on short shafts carried by the plates or brackets 19 and 20 mounted on the side plate 4 of the loom. An arm 23 on the end of the shaft 14 may be swung by the link 30 and the pawl 24 on this arm will engage the teeth of the gear 11 to turn the gears and the reel 10 as the fabric is produced.

An oscillating shaft 25 carries a crosshead 26 (Figs. 18 and 19) which has a dovetail groove in which is slidable a block 27 that may be positioned by the screw 28 to control the stroke of the pin 29 to which the lower end of the link 30 is connected. The feed of the reel 10 can therefore be accurately controlled.

*The reed.*

The warp threads A pass from spools to the loom in such a manner that at the rear end of the frame they normally constitute a section of a cylinder, which section is preferably about one hundred and twenty degrees long, although the length may be varied according to the width of the material to be woven. By means of heddles and operating devices therefor which will be explained later on, these strands are shown to be in six pairs of groups so that they can be moved toward and from the axis of this segment, one group of each pair being moved down by the heddles of that group, the strands of the other group of that particular pair remaining in their elevated position. This permits the shuttle to be moved between adjacent warp strands. The movement of these warp strands is substantially along lines radiating from a common central line and the reed is therefore made up of a frame (Fig. 20) consisting of the upper bar 22, lower bar 31, side bars 32 and the intermediate members or wires 33. Ears 34 are provided to secure the reed to the cross-bar 35 (Fig. 9). A small yoke 36 extends up from this bar 35 and carries a pin 37 that extends between the guide-bars 38 for the reed, (Fig. 7) which bars are carried by the cross frames 39, as shown in Fig. 25.

To this cross-bar 35 are connected the rack-bars 41 which mesh with the pins 42 carried by the sectors 43 on the shaft 25, which shaft is turned back and forth by means of the opposed solenoids 45—46, whose cores 47 (Fig. 26) are formed with teeth that mesh with the teeth of the gears 48 secured to this shaft 25. Four pairs of solenoids are shown but it will be understood that they act as one pair and that any desired number of them may be omitted. These solenoids may be mounted on the plates 40 secured to the sides of the loom.

As the warp strands converge toward the reel 10 as shown in Fig. 17, the reed is lowered to bring its upper narrower portion into engagement with these weft strands instead of the wider lower or outer portion, by forming the guide-bars 38 with a depressed portion 49 near the reel 10. The reed is moved forward toward the reel and back again at each movement of the shuttle.

*The heddles.*

As shown in Figs. 23, a portion only of the weft strands or picks B pass entirely across the fabric, and that the remainder pass only partly across, and that the overlapping lengths of these short picks are at the middle of the fabric. As these picks are all batted against each other by the reed, the fabric tends to assume the form shown in Fig. 24. But because of the movement of the fabric through the loom, the middle portion of the fabric is woven longer because the pull on the middle warp strands is greater, so that when the fabric is formed into a part of a tube, it assumes the desired shape shown in Fig. 24. The length of the short picks and their frequency is determined by a selecting mechanism operated by the shaft 25. The heddles themselves are operated in the following manner.

As shown in Fig. 2, three semi-circular bars 51, 52 and 53 are mounted on the side frames of the loom. Connected to the bar 51 are twelve solenoids numbered 54—59 and 54A—59A, inclusive. To the core 61 of each solenoid is connected a rod 62, as shown in Figs. 21 and 22, which connects to an arc-shaped yoke 63, having a slot 64 into which the shoulders 65 on the heddles 66 extend. (See Fig. 21A, Sheet 2.) These heddles are arranged in vertical two parallel planes and radiate from a common line. Each heddle is formed with an eye 67 through which a warp strand is passed, and alternate heddles connect to the yokes 63 actuated by a front magnet and the others to the yokes actuated by the rear magnets. The yokes and heddles are normally held up by the springs 68 that connect to the bar 53. The warp strands are therefore normally elevated above the path of the shuttle and are drawn down below this path by the magnets.

The rods 62 are guided in holes in the bar 52 and the heddles 66 are guided in holes in this bar 52 and in the bar 53 to move radially. As shown in the drawings, there are six pairs of groups of heddles, and these are moved by six pairs of magnets, but these magnets are again paired, the magnets 54 and 55, 56 and 57, 58 and 59 forming three pairs which are opposite the three pairs 54A and 55A, 56A and 57A, 58A and 59A.

The middle pairs 56—57 and 56A—57A are energized for each pick or weft strand woven into the fabric, but the side pairs are energized at intervals. The result is that the weft is interwoven with the middle warp strands at each actuation of the shuttle but this shuttle passes freely below the side warp strands one third of the time when the parts are arranged as shown in the drawings. Referring to Fig. 23, it will be seen that the weft strand B, which moves in the direction indicated by the arrows, has been carried across the warp strands by six movements of the shuttle. That all the rear groups of heddles were drawn down at the first movement of the shuttle; that front magnets 59, 58, 57 and 56 were energized at the second movement but that magnets 55 and 54 were not energized so that the warp threads on the left of the machine were left elevated and the shuttle passes freely under them. At the next movement, the magnet 54A and 55A are left unenergized but the other rear magnets are all energized. For the fourth movement of the shuttle, all the front magnets are energized and the weft interweaves with all the warp strands. For the fifth movement, magnets 58A and 59A are left unenergized and for the sixth movement, magnets 59 and 58 do not operate.

This results in two long picks and four short picks out of every six. The short picks over-lap at the middle of the fabric and when the picks are batted down by the reed, as indicated in Fig. 24, the middle part of the fabric is longer than the edges so that the fabric will fit closely around a vehicle tire.

In Fig. 23 only eighteen warp strands are shown. In actual practice about ten strands constitute a group. The width of the group and the order of short and long picks can be varied as desired. The mechanism for this control may be as follows.

On the end of the reed-actuating shaft 25 is a cross-head 65', (Fig. 28) which carries pins 66' to which the links 67' and 68' are connected, and these links are provided with teeth 69 that engage the teeth of the ratchet wheel 70 secured to the shaft 72. See Fig. 5. On this shaft and rotated by this wheel is a drum 73 of insulating material having conductor bars 74 to 79 inclusive mounted on the points of its teeth. A development of this drum is shown in Fig. 29 on Sheet 1.

Brushes 80 and 81 may connect to the main bus-bar 82 (Fig. 30) by means of the wire 83, and these brushes engage each of the contact bars 74 to 79 inclusive at the same time that these bars are engaged by the brushes 84 to 89 inclusive. The bus-bars 82 and 92 are connected to a switch 91 and to a current source G in any desired manner.

When the drum 73 is in the position shown in Fig. 30, (keeping in mind Fig. 29) the brushes 84, 85 and 86 will contact with the bar 74 and current will flow from the bus-bar 92 to the relays 101, 102 and 103 over the wire 104, and from these relays to the bar 74. These relays will close the following circuits. From the bus-bar 92, wire 105, armature plates 111 of the relays 101, 112, 102 and 103, wires 107, 108, 109 to the magnets 54A to 59A inclusive, and wires 106 and 105 to the bus-bar 82. As all the rear magnets were energized, the warp strands will be positioned for the first movement of the shuttle indicated in Fig. 23.

At the next movement of the reed, the drum 73 will be turned one step to the right as shown in Fig. 30A and relays 115 and 116 will be energized to close the circuit over the wires 118 and 119 to the magnets 56 to 59 inclusive so that the warp strands will be properly positioned for the second movement of the shuttle indicated in Fig. 23.

At the next movement of the reed, the drum 73 will be turned a second step to the right to the position shown in Fig. 30B, and relays 102 and 103 will be energized to close the circuit over the wires 108 and 109 from the magnets 56A and 59A inclusive so that the warp strands will be properly positioned for the third movement of the shuttle indicated in Fig. 23.

The proper positions of the warp strands for the fourth, fifth and sixth movements of the shuttle, indicated in Fig. 23, are produced by the magnets 59 to 54 inclusive, 54<sup>A</sup> to 57<sup>A</sup> inclusive, and 57 to 54 inclusive, respectively, through the actions of the relays 114, 115 and 116, 101 and 102, and 114 and 115 respectively.

It will be seen that the drum 73 is given one complete step for each complete actuation of the reed, and that the number of contact bars in this drum will always be a multiple of the number of movements of the shuttle to complete a cycle of weaving operations. The relays shown will preferably be secured to the board 121 mounted on the right side of the loom as shown in Fig. 5.

The shuttle and its mechanism.

The shuttle (Figs. 11 and 12) is a cylinder 124 of steel or iron and in it is a removable plug 125 that carries the spool 126 of weft yarn. A circumferential groove 127 in this shuttle receives the teeth 128 on the track 129 (Fig. 26) whereby the shuttle is caused to constantly travel the same path. The reason for using the teeth 128 instead of a guide rib is that the shuttle runs over the warp strands that are moved down by the energized magnets and these depressed strands can always lie between the teeth 128 without interfering with the shuttle. This track 129 lies in the notches 130 (Fig. 13) of the central poles 131 of the eight electromagnets 132 to 139 inclusive which are mounted between the arcuate bars 141 and 142. The cores of these magnets are preferably laminated and E-shaped, the ends of the outer poles 143 being level with the ends of the inner poles 131, the windings 144 being between them.

The shuttle runs on an arcuate track from the position 124 shown in solid lines in Figs. 2 and 9, these being views from opposite ends of the machine, to the position 124<sup>A</sup> indicated by dotted lines, and in doing so depresses certain levers in its path and closes certain switches. In Fig. 10, one of these devices is shown on a large scale.

The frame 147 is secured to a support 141 or 142 and carries a slidable rod 148 to which the lever 149 is pivoted. The other end of the lever is mounted on a pin 150 carried by the next adjacent frame. The switch contacts 152 and 153 are caused to engage when the rod 148 is depressed. A short guide link 154 may be employed if desired.

The shuttle 124 rolls from one end of its path to the other over a series of magnets which are energized in advance of the shuttle as the switches are closed. One set of switches is located on the front side of the frame bar 141 and a second set on the rear side of the bar 142. The former are diagrammatically shown in Fig. 31, and the latter in Fig. 33, the view being from the front end of the machine in both cases. When the shuttle reaches the end of its path it opens a circuit to a relay which results in the solenoids 45 or 46 being energized to operate the reed, a magnet holding the shuttle until the circuit to this magnet is opened through mechanism controlled by the reed-actuating solenoids, to release the shuttle.

The reed and shuttle circuits.

The holding magnets 132 and 139 (Fig. 31) have circuits independent of the actuating magnets 133 to 138 inclusive. The windings of these actuating magnets are severally connected by the wires 155 to the wires 156 and 157 to the bus-bar 82. The contacts 153 of the front switches for the magnets 133—138 are connected by the wires 158, 159 and 160 to the contact plate 162 of the double relay 163—164 and by this plate to the wire 165 and bus-bar 92. The contacts 153 of the rear switches for the magnets 133—138 are connected by the wires 166, 167 and 168 to this same contact plate and by the wire 165 to the same bus-bar 92. The position of this contact plate will therefore determine whether the shuttle is to roll to the left or right. One end of the winding of each magnet connects to two contacts 152, one on each side of the shuttle track.

When the magnet 139 releases the shuttle, as will be explained hereafter, the shuttle will roll down its track and depress the lever 149 (Fig. 31) of the first switch and thus establish the following circuit. From bus-bar 92 over wire 165, plate 162, wires 160, 159 and 158, contacts 153 and 152, to the winding of the magnet 138, thence over wires 155, 156 and 157 to the bus-bar 82. As the shuttle rolls along, the switches are closed for the magnets in advance, and the momentum imparted to this shuttle will carry it to the magnet 132 which will hold it. When the circuit to this magnet is opened, which is after the plate 162 has been moved to close the circuit to the wire 168 and the wiring shown in Fig. 33, the shuttle will roll in the opposite direction to the position shown in Fig. 31. It will be noted that the current to each magnet is cut off just before the shuttle reaches it so that there will be no retarding action by that magnet.

When the shuttle reaches the position shown in solid lines in Fig. 31, it separates the contacts 170 and 171 and opens the circuit from the bus-bar 92 over the wire 173, winding 164, wire 174, contacts 170—171, wires 175 and 176 to bar 82, and permits the plate 162 to be moved from the position shown in Fig. 33 to that shown in Fig. 31 to close the circuits shown in Fig. 31 to the magnets 133 to 138 inclusive. Moving this plate also closes the circuit from the bar 92 over the wire 165, plate 162, wire 177, contacts 178 and 179, wire 180 to winding 181 of the relay that controls the solenoids for the reed, wire 182 to the contact 183, wheel 184, and wire 185 to the bar 82. The relay 181 being energized, its plate 187 will be lifted to connect contacts 188 and 189 so that current will now pass from the bar 92 over wire 191 to the solenoids 46, which are connected in pairs by the wires 192, thence over wires 193 to the contact 189, plate 187, contact 188 and wire 194 to the bar 82. The solenoids 46 will now move the reed toward the reel and bat the weft into its position in the finished fabric. In actual practice, the plate 187 will probably be made of two parts as indicated in Fig. 6.

The windings 163 and 164 of the double relay are always connected to the bar 92 by the wire 173. The circuit from the winding 164 by way of the contacts 170 and 171 has just been described. The circuit from the winding 164 consists of the wire 196, contacts 197 and 198, and wires 199 and 176 to the bar 82. The two windings 163 and 164 are thus energized and the plate 162 is stationary except when the shuttle 124 separates the contacts 170 and 171 or the contacts 197 and 198. In the former case the circuits for the switches shown in Fig. 31 are closed and in the latter case, the switches shown in Fig. 33.

On the same shaft 72 with the drum 73 are two contact wheels 184 and 201 and two cams 202 and 203, shown diagrammatically in Figs. 31 to 34. These too are turned one twelfth of a revolution for each reciprocation of the reed, or one sixth revolution for each pick. As stated before, the reed-solenoids 46 become energized when the contacts 170 and 171 are separated and they will turn the shaft and the parts 184, 202, 203 and 201 to the positions shown in Fig. 32. This results in the circuit 177—178—179—180 to the relay 181 being opened and the plate 187 to fall as shown in Fig. 32. The circuits to the double relay 163—164 remain the same. The new circuit however is now from the bar 92 over wire 191 to solenoids 45, connected in pairs by wires 204, wire 205 to contact 206, plate 187, contact 207 and wire 194 to the bar 82. The opposite solenoids being energized, the reed is returned to normal position, at which instant the shuttle 124 should be released for its movement toward the left side of the loom. The means for opening and closing the circuits to the magnets 132 and 139 are as follows, it being understood that the shuttle 124 must be held at either end of its path while the reed is operating.

A wire 210 extends from the bar 92 to the magnet 132 and a wire 211 from the wire 210 to the magnet 139. A wire 212 from the magnet 132 ends in a contact 213 adjacent the plate 214 of the relay 215, while a wire 216 from the magnet 139 ends in the contact 217 at this same plate. When the relay 215 is energized, the shuttle will be held at the right end of its path and will be held at the left end when the relay is de-energized. A wire 218 connects this relay 215 to the bar 92, while a wire 219 ends in a contact 220 adapted to engage the contacts 223 carried by the controller wheel 201, which is connected to the bar 82 by the wire 224. Contacts 225 and 226 respectively connect to the wire 194 extending to the bar 82.

When the controller wheel 201 is in the position shown in Fig. 31, the relay 215 is energized and the shuttle held as shown in Fig. 31. At the end of the operating stroke of the reed, the members 184, 202, 203 and 201 have been turned to the position shown in Fig. 32 which indicates that the circuit to the solenoids 46 has been opened and to the solenoids 45 has been closed, but that the circuit to the relay 215 is still closed which means that the shuttle will be held by the magnet 139 during the return stroke of the reed. At the end of this return stroke the member 201 has been moved as shown in Fig. 33, to disengage the contact 220 and the relay 215 becomes de-energized, the plate 214 falls, the circuit to the magnet 139 is opened and that to the magnet 132 is closed and the shuttle rolls to the left down and then up its path, depressing the levers 149 shown in Fig. 31 until it reaches the magnet 132 which retains it at the instant the shuttle separates the contacts 197 and 198 which opens the circuit to the winding 163 of the double relay. When the shuttle left the magnet 139, the contacts 170 and 171 engaged, closing the circuit to the winding 164 of the double relay which moved the plate 162 to the position shown in Fig. 33 as soon as the shutter reached the position shown in that figure.

At the completion of the return stroke of the reed, the cams 202 and 203 were in the positions shown in Fig. 33 and the circuit to the contacts 178 and 179 broken by the plate 162, a new circuit is now closed consisting of the wire 165, plate 162, wire 226, contacts 227 and 228 held in engagement by the cam 203, wire 180 to the relay 181, and wire 182 to the bar 82. This circuit again causes the plate 187 to close the circuit to the solenoids 46, which circuit is opened when the reed has completed its working stroke as indicated in Fig. 34. The return stroke is made by reason of the plate 187 again closing the gap between the contacts 206 and 207.

The loom is operated by electro-magnetic means entirely, and each part must wait until the preceding device has completed its movement and either closed or opened proper circuits to cause the operation of the next device. Thus the shuttle is held stationary while the reed is operating and the reed is operated immediately after the shuttle has reached the end of its path. The heddle magnets are not energized until the reed has nearly completed its return stroke but are completely energized so that the proper heddles have been moved radially outward before the shuttle is released. But the structures of these different parts do not involve invention, for with the exception of the shuttle, its track and the reed, the details are probably all old. We do not therefore desire to be limited to the exact constructions shown which may all be modified or have equivalent devices substituted for them without departing from the spirit of our invention as set forth in the following claims.

We claim:—

1. In a loom, the combination of means to position the warp strands, a cylindrical shuttle, and stationary electro-magnets to cause the shuttle to roll between the warp strands.

2. In a loom, the combination of means to position the warp strands, a cylindrical shuttle and a track therefor, and stationary magnets to cause the shuttle to roll through between the warp strands.

3. In a loom, the combination of heddles to position the warp strands, a cylindrical shuttle and an arcuate track therefor, and a series of stationary electro-magnets for causing the shuttle to roll along its track between the warp strands.

4. In a loom, the combination of heddles radiating from a common center to position the warp strands, a cylindrical shuttle and a vertical arcuate track therefor, and a series of stationary electro-magnets for causing the shuttle to roll back and forth along its path between the warp strands.

5. In a loom, the combination of heddles radiating from a common center to position the warp strands, electro-magnetic means for actuating groups of heddles to position the warp strands, a cylindrical shuttle and a track therefor, and a series of stationary electro-magnets for causing the shuttle to roll along its path between the warp strands.

6. In a loom, the combination of heddles to position the warp strands and means to move groups of said heddles to position the warp strands, a cylindrical shuttle, and stationary electro-magnets to cause the shuttle to roll between the warp strands.

7. In a loom, the combination of means to position the warp strands, a cylindrical shuttle and a track therefor, means to hold the shuttle at either end of its track, and stationary means for rolling the shuttle through between the warp strands.

8. In a loom, the combination of means to position the warp strands, a cylindrical shuttle and a track therefor, means to hold the shuttle at either end of its track, and a series of stationary electro-magnets for causing the shuttle to roll along its path between the warp strands.

9. In a loom, the combination of means to position the warp strands, a cylindrical shuttle and a track therefor, electro-magnets to hold the shuttle at either end of its track, and means to cause the shuttle to roll back and forth along its path between the warp strands.

10. In a loom, the combination of means to position the warp strands, a cylindrical shuttle and an arcuate path therefor in a vertical plane, electro-magnets to hold the shuttle at either end of its track, and means to roll the shuttle back and forth along its path between the warp strands.

11. In a loom, the combination of means to position the warp strands, a cylindrical shuttle and an arcuate track therefor, electro-magnets to hold the shuttle at either end of its track, and a series of stationary electro-magnets to roll the shuttle back and forth along its path between the warp strands.

12. In a loom, the combination of heddles radiating from a common center and slidable to position the warp strands, said heddles being arranged in groups, electro-magnetic means for moving the heddles of each group independently of the other groups, a shuttle and an arcuate track therefor whose center is that of the heddles, and a series of electro-magnets for causing the shuttles to move along its path between the warp strands.

13. In a loom, the combination of heddles to position the warp strands and means to move the same, a cylindrical shuttle having a circumferential groove, a track for the shuttle having a row of pins projecting into said groove as the shuttle rolls along the path to hold the shuttle on the track, and means to cause the shuttle to roll back and forth along its track.

14. In a loom, the combination of means to position the warp strands, a cylindrical shuttle having a circumferential groove, an arcuate track for the shuttle having a longitudinal row of pins projecting into said groove as the shuttle rolls along the path to hold the shuttle in the track, and means to cause the shuttle to roll back and forth along its track.

15. In a loom, the combination of means to position the warp strands, a cylindrical shuttle having a circumferential groove, an arcuate track for the shuttle arranged in a vertical plane and having a longitudinal row of pins projecting into said groove as the shuttle rolls along the path to hold the shuttle on the track, and stationary electro-magnets to cause the shuttle to roll along its track.

16. In a loom, the combination of means to position the warp strands, a cylindrical shuttle having a circumferential groove, an arcuate track for the shuttle arranged in a vertical plane and having a longitudinal row of pins projecting into said groove as the shuttle rolls along the path to hold the shuttle on the track, stationary electro-magnets to cause the shuttle to roll along its track and electro-magnets to hold the shuttle at the ends of its track.

17. In a loom, the combination of a series of heddles radiating from a common central line and arranged in two parallel planes, guides for the heddles, a series of electro-magnetic devices, means connecting the heddles in groups to said electro-magnetic devices, means for controlling the operation of said electro-magnetic devices.

18. In a loom, the combination of a series of heddles radiating from a common central line and arranged in two parallel planes, guides for the heddles, a series of pairs of electro-magnetic devices, means connecting the heddles in groups to said electro-magnetic devices, and springs to move the heddles toward said central line.

19. In a loom, the combination of means to position the warp strands, a shuttle to carry the weft strand through between the warp strands, a reed to batten the weft strand against the finished fabric, solenoids and cores therefor, and means including rack bars and toothed segments whereby the solenoids may move the reed in opposite directions.

20. In a loom, the combination of means to position the warp strands, a shuttle to carry the weft strand through between the warp strands, a track for the shuttle, a reed to batten the weft strands against the finished fabric, solenoids to move the reeds in opposite directions, and means operated by the shuttle at the ends of its track for causing the solenoids to be energized.

21. In a loom, the combination of means to position the warp strands, a shuttle to carry the weft strand through between the warp strands, a track for the shuttle, magnets to hold the shuttle at the ends of its track, a reed to batten the weft strands against the finished fabric, solenoids to move the reed in opposite directions, switches controlled by the shuttle at the ends of its travel for causing the solenoids to be energized, and means operatively connected to the reed at the end of its travel to cause the magnets to release the shuttle.

22. In a loom, the combination of means to position the warp strands, a shuttle to carry the weft strand through between the warp strands, a track for the shuttle, magnets to hold the shuttle at the ends of its travel, a reed to batten the weft strands against the finished fabric, solenoids to move the reed in opposite directions, a controller actuated by said solenoids, means controlled by the shuttle at the ends of its travel to cause the solenoids to be energized, and means connected to said controller for causing said magnets to release the shuttle after the reed has returned to normal position.

23. In a loom, the combination of heddles radiating from a common center and slidable to position the warp strands, said heddles being arranged in groups, an electro-magnet for moving the heddles of each group independently of the other groups, a shuttle to carry the weft strands through between the warp strands, a track for the shuttle, magnets to hold the shuttle at the ends of its travel, a reed to batten the weft strands against the finished fabric, solenoids to move the reed in opposite directions, a controller actuated by the solenoids, means controlled by the shuttle at the ends of its travel to cause the solenoids to be energized, means connected to said controller to cause selected groups of heddles to be actuated, and means also connected to said controller to cause the magnets to release the shuttle after the reed has returned to normal position.

24. In a loom, the combination of a series of heddles radiating from a common center and provided with eyes to receive the warp strands, springs to normally hold the heddles inward toward said center, electro-magnets to move the heddles outward, a shuttle for the weft strand, and an arcuate track in a vertical plane upon which the shuttle may travel above the warp strands which have been moved outward and below the warp strands that are in normal position.

25. In a loom, the combination of a series of heddles radiating from a common center and provided with eyes to receive the warp strands, springs to normally hold the heddles inward toward said center, electro-magnets to move the heddles outward, a shuttle for the weft strand, and an arcuate track in a vertical plane upon which the shuttle may travel above the warp strands which have been moved outward and below the warp strands that are in normal position, a reed to batten the weft strand against the finished fabric and means to actuate the reed.

26. In a loom, the combination of a series of heddles radiating from a common center and provided with eyes to receive the warp strands, springs to normally hold the heddles inward toward said center, electro-magnets to move the heddles outward, a shuttle for the weft strand, and an arcuate track in a vertical plane upon which the shuttle may travel above the warp strands which have been moved outward and below the warp strands that are in normal position, a reed to batten the weft strand against the finished fabric, solenoids to move the reed in opposite directions, a controller actuated by the solenoids, means controlled by the shuttle at the ends of its travel to cause the solenoids to be energized, means connected to said controller to cause selected groups of electro-magnets to be energized and of heddles to be moved outwardly, the remainder of the heddles remaining in normal position to determine the length of the weft strands.

27. In a loom, the combination of means to position the warp strands, a shuttle, a series of stationary electro-magnets to actuate the shuttle, an electric circuit for each magnet, and means operated by the shuttle to close the circuits to said magnets.

28. In a loom, the combination of means to position the warp strands, a cylindrical shuttle and an arcuate path therefor, a series of stationary electro-magnets to cause the shuttle to roll on its path between the warp strands, an electric circuit for each magnet and means operated by the shuttle to close the circuits to said magnets in turn as the shuttle approaches said magnets.

29. In a loom, the combination of means to position the warp strands, a shuttle and a series of electro-magnets positioned along the path of the shuttle, which magnets when energized serve to move the shuttle along its path, and means controlled by said shuttle to cause the magnet in advance of the shuttle to be energized to cause the shuttle to move up to said energized magnet and to be de-energized when the shuttle reaches said magnet.

JAS. E. CLARK.
WILLIAM A. SCHAFFER.
THOMAS E. CLARK.